United States Patent [19]
Sparks et al.

[11] Patent Number: 5,711,403
[45] Date of Patent: Jan. 27, 1998

[54] RAPID APPLY SERVO FOR A BRAKE BAND OF AN AUTOMATIC TRANSMISSION

[75] Inventors: Douglas S. Sparks, Lathrup Village; Robert Cary Haase, Southfield, both of Mich.

[73] Assignee: Ford Global Technologies, Inc., Dearborn, Mich.

[21] Appl. No.: 743,586

[22] Filed: Nov. 4, 1996

[51] Int. Cl.$^6$ .................................................. F16D 51/00
[52] U.S. Cl. ........................ 188/77 W; 91/29; 91/32
[58] Field of Search .................. 188/77 W, 77 R; 91/28, 29, 32; 92/130 R

[56] References Cited

U.S. PATENT DOCUMENTS

| | | | |
|---|---|---|---|
| 2,859,593 | 11/1958 | Brunot | 91/29 X |
| 4,111,283 | 9/1978 | Hastings, Jr. | 91/29 X |
| 5,544,565 | 8/1996 | Van Selous | 92/130 R |

FOREIGN PATENT DOCUMENTS

| | | | |
|---|---|---|---|
| 3417703 | 1/1987 | Germany. | |
| 3417784 | 1/1988 | Germany. | |
| 84433 | 5/1985 | Japan | 188/77 W |
| 40-4019465 | 1/1992 | Japan | 188/77 W |
| 40-4107329 | 4/1992 | Japan | 188/77 W |

*Primary Examiner*—Peter M. Poon
*Attorney, Agent, or Firm*—Frank G. McKenzie

[57] ABSTRACT

A servo for operating a brake band in an automatic transmission includes a transmission casing and servo cover defining a servo cylinder, a servo piston supported for displacement within the cylinder, first and second sealed volumes within the cylinder, a valve for connecting the fluid sump to one pressure area and for closing that connection and opening a connection to line pressure while maintaining the first pressure area connected to line pressure.

11 Claims, 2 Drawing Sheets

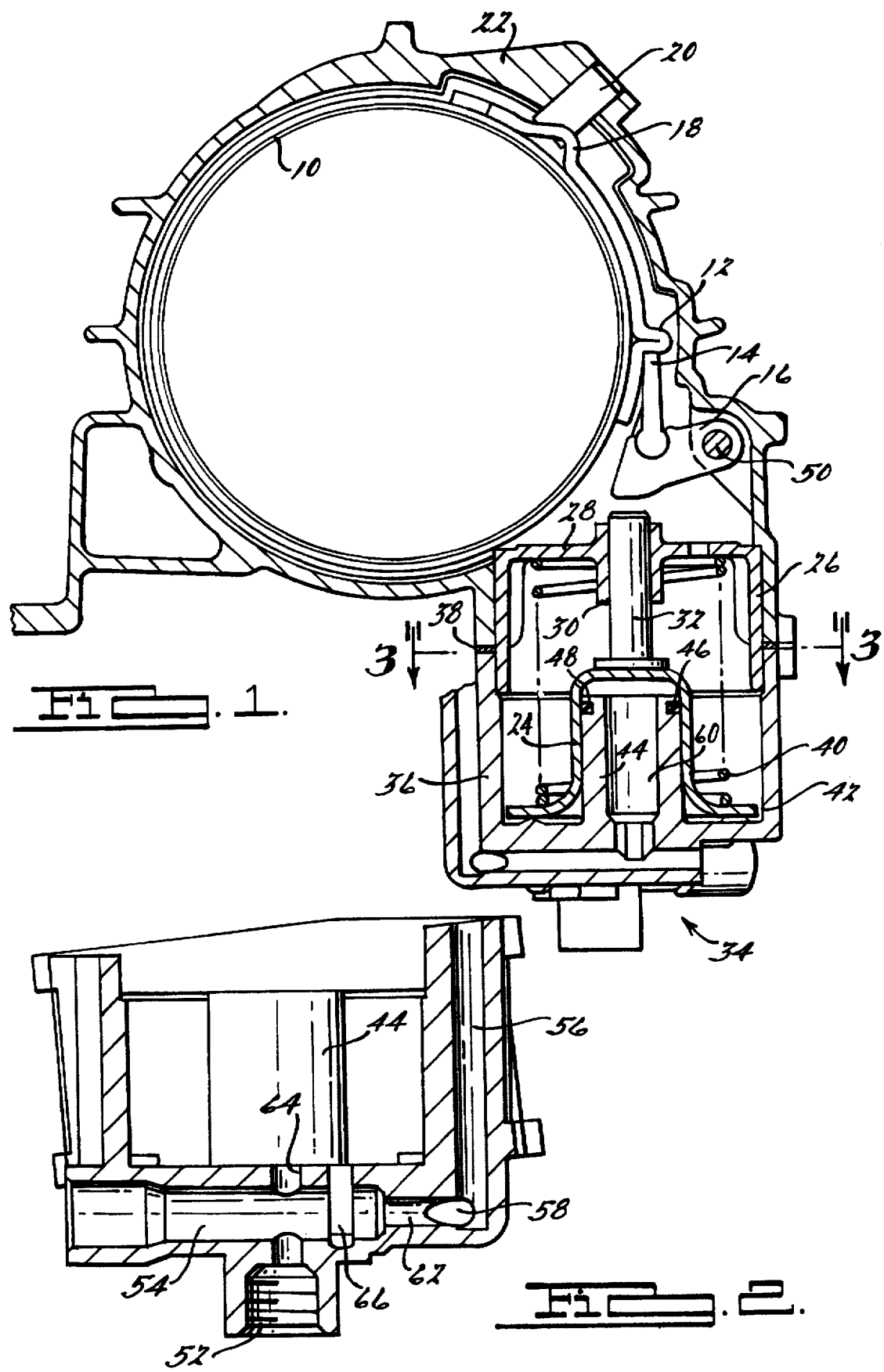

RAPID APPLY SERVO FOR A BRAKE BAND OF AN AUTOMATIC TRANSMISSION

BACKGROUND OF THE INVENTION

1. Technical Field

This invention pertains to the field of automatic transmission control, and more particularly to hydraulic actuation of a brake band that holds a component of the gearset against rotation.

2. Description of the Prior Art

A servo mechanism used to operate a brake band in an automatic transmission conventionally includes an hydraulically actuated piston and a piston chamber, within which a piston moves in response to the presence and absence of hydraulic pressure in the chamber.

Conventionally, the servo is connected directly to a source of line pressure, whose magnitude is maintained electronically in response to the magnitude of torque transferred through the transmission.

When a large volume of hydraulic fluid is supplied to a brake servo in order to apply a brake band, the magnitude of line pressure throughout the system can decrease temporarily while a large volume of fluid is being used to fill the servo piston. This drop in volume can prolong the period during which the brake band would be applied if line pressure were maintained at a relatively high magnitude.

A vehicle operator, while moving the range selector of an automatic transmission to the reverse drive position, will recognize delay in producing reverse drive due to these conditions and their effect on the period required to apply the reverse brake band.

SUMMARY OF THE INVENTION

It is an object of this invention to provide a system that improves operation of the brake band servo by minimizing any decrease in system pressure due to supplying a large volume of hydraulic fluid rapidly to fill the servo piston. It is another object to decrease the length of time required to engage the brake band and produce the operating range selected by the vehicle operator.

In realizing these objects and advantages in an automatic transmission, a system according to this invention for operating a hydraulic servo that controls the apply and release states of a brake band includes a cylinder; a displaceable piston located in the cylinder, the piston having a first pressure area associated with a first volume of the cylinder and a second pressure area associated with a second volume of the cylinder; means adapted to apply and release the brake band in response to displacement of the piston; a spring urging the piston toward a first position where the brake band is released; a sump adapted to contain fluid at relatively low pressure; a source of line pressure at relatively high pressure hydraulically connected to the first pressure area; and a valve responsive to the magnitude of line pressure for alternately opening a connection between the sump and the second pressure area and opening a connection between the line pressure source and the second pressure area.

Because fluid from the sump maintains the volume of the servo below the second pressure area filled, there is no substantial decrease in the magnitude of line pressure due to filling that volume. Furthermore, in comparison to a conventional hydraulic system, there is a reduction in the length of time required to fully apply the brake band because the volume of the servo associated with the second pressure area is continually filled with hydraulic fluid drawn from the sump as line pressure, at a low but increasing magnitude, strokes the piston.

BRIEF DESCRIPTION OF THE DRAWINGS

FIG. 1 is cross section through a transmission casing in the vicinity of a brake band and the associated apply servo.

FIG. 2 is a cross section through a servo cover taken at plane 2—2 of FIG. 3.

DESCRIPTION OF THE PREFERRED EMBODIMENT

Figure 3:
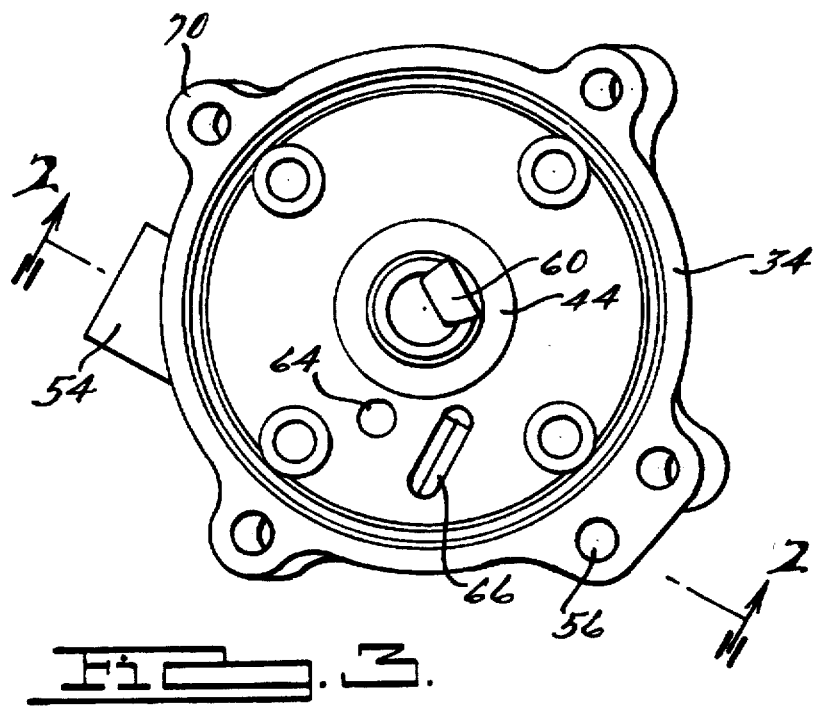
FIG. 3 is a top view of the servo cover with the return spring and piston absent.

Referring first to FIG. 1, a brake band 10, encircling a brake drum (not shown), has an apply anchor 12 welded to one end of the band and contacting a strut 14 supported on a lever 16. The opposite end of the brake end has a welded reaction anchor 18, which contacts a pin 20 fitted securely against displacement in a bore formed in the transmission casing 22. Contact between pin 20 and reaction anchor 18 prevents displacement of the brake band, whereas upward movement of the strut 14 into contact with the apply anchor 12 causes the brake band to move into frictional engagement with the outer surface of the brake drum. In that way, the band holds the brake drum against rotation on the transmission casing.

The casing contains the components of a gearset, hydraulically actuated clutches and brakes, which control the gearset components to produce the various speed ratios of the transmission. The brake drum is locked against rotation when the servo piston 24 is forced by hydraulic pressure upward to apply the brake band.

The lower surface of the casing defines an opening, within which is fitted a circular guide plate 26 having an outer cylindrical flange and a circular web 28 formed with a boss 30 having a central bore within which is fitted a rod 32. A servo cover 34 includes cylindrical flanges 36, which are sealed against the passage of hydraulic fluid at the casing by a seal 38.

The guide plate and cover together define a cylinder in which piston 24 moves upward due to pressurized hydraulic fluid below the piston and downward due to the effect of a compression spring 40, which continually urges the piston to the position shown in FIG. 1. Rod 32 is fixed to the head of piston 24 and is guided in displacement by the bore of boss 30.

Piston 24 carries a dynamic hydraulic seal 42 at its radially outer edge to prevent the passage of fluid between the inner cylindrical surface of cover 34 and the piston. Cover 34 also includes a centrally located block 44 formed with an annular recess 46 near its upper end, into which recess is fitted a dynamic seal 48, which prevents the passage of hydraulic fluid between block 44 and the lower surface of piston 24.

The pressure located on the lower surface of the piston above seal 48 and projected normal to the central axis of the cylinder is pressure area 1. The pressure area on the lower surface of the piston, between the outer diameter of block 44 and seal 42, and projected normal to the central axis of the cylinder is pressure area 2. When either or both of these areas are pressurized, piston 24 moves upward within cover 34 against the effect of compression spring 40, forces the upper end of rod 32 into contact with lever 16, and causes that lever to rotate about its pivot 50, thereby forcing strut 14 upward and engaging the brake band with the brake drum. When these pressure areas are vented, compression spring 40 moves the piston downward, thereby removing frictional contact between the inner surface of the brake band and the outer surface of the brake drum.

Referring now to FIG. 2, the cover 34 contains passage 52, hydraulically connected to a fluid sump containing fluid at relatively low pressure and connected also to a valve chamber 54. Passage 56 is continually connected to a source of line pressure, a relatively higher pressure than the pressure of the fluid in the sump, and through a transverse passage 58, which is connected to passage 60, formed through block 44 and communicating with pressure area 1. Passage 62 connects the source of line pressure also to the end of valve chamber 54.

Passage 64, which is substantially vertically directed, connects the sump to pressure area 2 through passage 52 and valve chamber 54. Passage 66 connects valve chamber 54 to pressure area 2.

FIGS. 2 and 3 show lugs 70 on the periphery of the servo cover by which a bolted connection to the lower surface of the transmission case is made through a hydraulically sealed connection.

Figure 4:
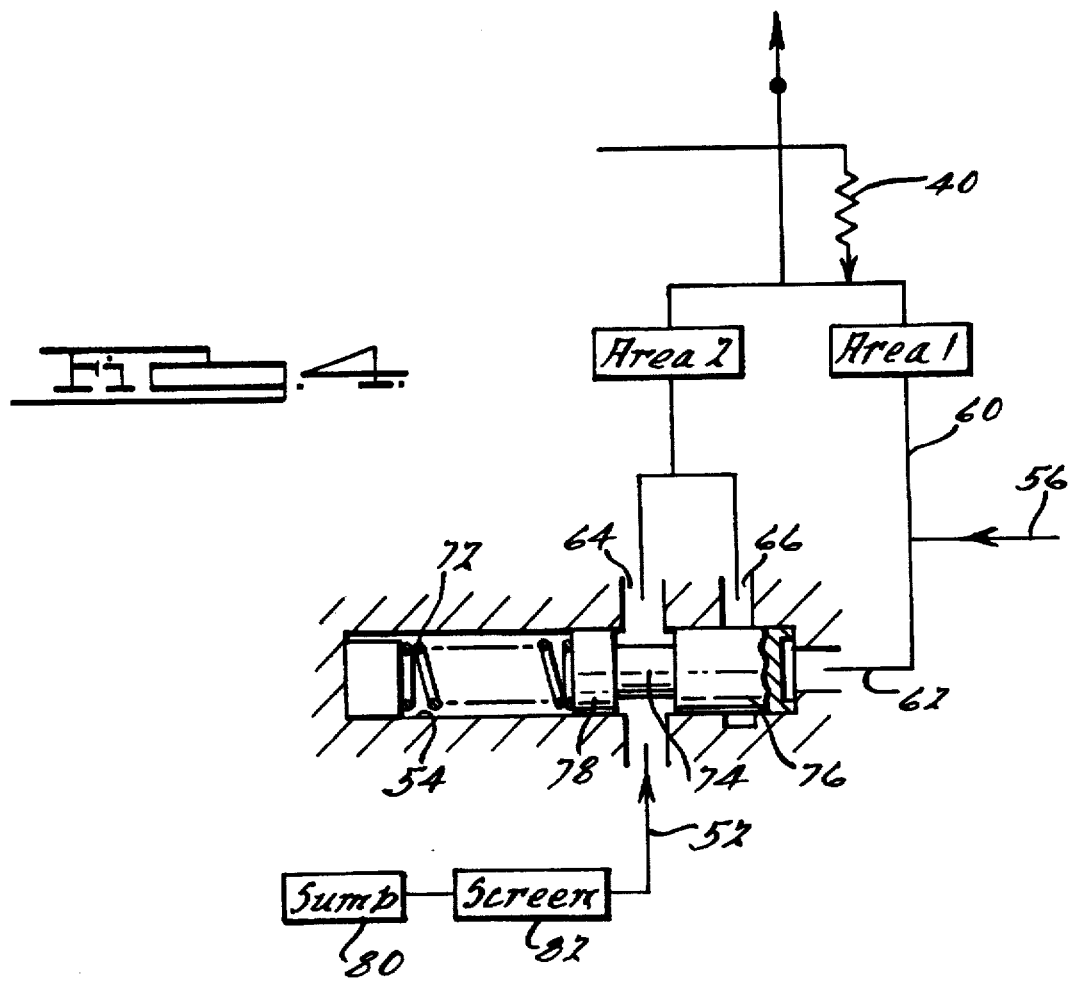
FIG. 4 is a schematic diagram of the system according to this invention.

Referring now to FIG. 4, valve spool 74 has first and second control lands 76, 78 for opening and closing various hydraulic connections. A compression spring 72, located within the valve body, continually urges valve spool 74 to a position at the right-hand end of valve chamber 54. In that position, the source of line pressure 56 is closed to area 2 but is opened through passage 60 to pressure area 1, and the fluid sump 80 is connected through screen 82, passages 52, 64, and chamber 54 to the volume below pressure area 2. Therefore, when line pressure in passage 56 is relatively low, such as when the brake band is disengaged, pressure area 2 is filled with fluid at sump pressure and pressure area 1 is low or vented.

When line pressure supplied to the servo increases, spool 74 moves leftward against the effect of spring 72, while maintaining an open connection between sump 80 and pressure area 2. As the spool moves leftward, line pressure is continually connected to pressure area 1 through passages 56 and 60. This action moves piston 24 upward and forces rod 32 into contact with lever 16, which moves strut 14 and the apply anchor 12 toward a position where the brake band engages the brake drum. As the piston strokes in this way, a partial vacuum created in pressure area 2 draws fluid from the slump through passages 52, 64, thereby maintaining the volume below pressure area 2 filled with fluid. As line pressure increases further, control land 76 closes passage 64 and opens passage 66. When this occurs, line pressure is applied to pressure areas 1 and 2 so that the entire area of piston 24 is connected to line pressure, and the brake band fully engages the brake drum.

Because fluid from the sump maintains filled the volume of the servo below pressure area 2, there is no substantial decrease in the magnitude of line pressure due to filling that volume. Furthermore, in comparison to a conventional hydraulic system, there is a reduction in the length of time required to fully apply the brake band because the volume of the servo below pressure area 2 is continually filled with hydraulic fluid drawn from the sump as line pressure, at a low but increasing magnitude, strokes the piston.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

We claim:

1. In an automatic transmission, a system for operating a hydraulic servo that controls the apply and release states of a brake band, comprising:

a cylinder having a central axis;

a piston located in the cylinder, displaceable along the axis, having a first hydraulically sealed pressure area and a second hydraulically sealed pressure area thereon;

means adapted to apply and release the brake band in response to displacement of the piston;

a sump adapted to contain fluid at relatively low pressure;

a source of line pressure at relatively high pressure, hydraulically communicating with the first pressure area; and a valve responsive to the magnitude of line pressure for alternately opening communication between the sump and the second pressure area, and for opening communication between the line pressure source and the second pressure area.

2. The system of claim 1, further comprising a spring urging the piston toward a first position where the brake band is released.

3. The system of claim 1, further comprising:

a first seal surrounding the first pressure area for preventing the passage of fluid therepast into the second pressure area, a portion of the volume of the cylinder bounded by the first seal and first pressure area defining a first volume continually connected to the line pressure source; and a second seal surrounding the second pressure area for preventing the passage of fluid therepast, a portion of the volume of the cylinder bounded by the second seal and second pressure area defining a second volume alternately connected by the valve to the sump and line pressure source.

4. The system of claim 1, wherein the valve:

opens communication between the sump and the second pressure area and closes communication between the line pressure source and the second pressure area when line pressure is equal to or less than a predetermined magnitude, and closes communication between the sump and the second pressure area and opens communication between the line pressure source and the second pressure area when line pressure is greater than said predetermined magnitude.

5. In an automatic transmission, a system for operating a hydraulic servo, comprising:

a cylinder having a central axis;

a piston located in the cylinder, displaceable along the axis, having a first hydraulically sealed pressure area and a second hydraulically sealed pressure area thereon;

a spring urging the piston toward a first position where the brake band is released;

a sump adapted to contain fluid at relatively low pressure;

a source of line pressure at relatively high pressure, hydraulically communicating with the first pressure area; and a valve responsive to the magnitude of line pressure for alternately opening communication between the sump and the second pressure area, and for opening communication between the line pressure source and the second pressure area.

6. The system of claim 5, further comprising:

a first seal surrounding the first pressure area for preventing passage of fluid therepast into the second pressure area, a portion of the volume of the cylinder bounded by the first seal and first pressure area defining a first volume continually connected to the line pressure source; and a second seal surrounding the second pressure area for preventing passage of fluid therepast, a portion of the volume of the cylinder bounded by the second seal and second pressure area defining a second volume alternately connected by the valve to the sump and line pressure source.

7. The system of claim 5, wherein the valve further comprises:

a chamber communicating with the line pressure source, sump, and first pressure area;

a spool located in the chamber for movement in response to line pressure, having control lands thereon for opening a connection between the sump and second pressure area and closing a connection between the line pressure source and second pressure area when line pressure is equal to or less than a first predetermined pressure, and for closing a connection between the sump and second pressure area and opening a connection between the line pressure source and second pressure area when line pressure is greater than said first predetermined pressure source.

8. The system of claim 7, further comprising a spring for urging the spool to a position where the line pressure source is closed to the chamber.

9. The system of claim 5, wherein the valve:

opens communication between the sump and the second pressure area and closes communication between the line pressure source and the second pressure area when line pressure is less than a predetermined magnitude, and closes communication between the sump and the second pressure area and opens communication between the line pressure source and the second pressure area when line pressure is greater than said predetermined magnitude.

10. In an automatic transmission system having a cylinder, a piston located in the cylinder, displaceable along an axis, having a first hydraulically sealed pressure area and a second hydraulically sealed pressure area thereon, a sump adapted to contain fluid at relatively low pressure, and a source of line pressure at relatively high pressure, hydraulically communicating with the first pressure area, a method for operating a hydraulic servo, comprising the step of:

for alternately opening communication between the sump and the second pressure area, and for opening communication between the line pressure source and the second pressure area.

11. The method of claim 10, wherein the step further comprises:

opening communication between the sump and the second pressure area and closing communication between the line pressure source and the second pressure area when line pressure is equal to or less than a predetermined magnitude, and closing communication between the sump and the second pressure area and opening communication between the line pressure source and the second pressure area when line pressure is greater than said predetermined magnitude.

* * * * *